US008243118B2

(12) United States Patent
 Pace

(10) Patent No.: US 8,243,118 B2
(45) Date of Patent: Aug. 14, 2012

(54) SYSTEMS AND METHODS FOR PROVIDING PERSONAL VIDEO SERVICES

(75) Inventor: Charles P. Pace, North Chittenden, VT (US)

(73) Assignee: Euclid Discoveries, LLC, Concord, MA (US)

( * ) Notice: Subject to any disclaimer, the term of this patent is extended or adjusted under 35 U.S.C. 154(b) by 551 days.

(21) Appl. No.: 12/522,324

(22) PCT Filed: Jan. 4, 2008

(86) PCT No.: PCT/US2008/000092
§ 371 (c)(1),
(2), (4) Date: Jul. 7, 2009

(87) PCT Pub. No.: WO2008/091485
PCT Pub. Date: Jul. 31, 2008

(65) Prior Publication Data
US 2010/0073458 A1      Mar. 25, 2010

Related U.S. Application Data

(60) Provisional application No. 60/881,979, filed on Jan. 23, 2007.

(51) Int. Cl.
*H04M 11/00* (2006.01)
(52) U.S. Cl. ..................... 348/14.01; 382/254
(58) Field of Classification Search .... 348/14.01–14.08, 348/14.09, 557; 382/115, 254
See application file for complete search history.

(56) References Cited

U.S. PATENT DOCUMENTS

| | | | |
|---|---|---|---|
| 5,117,287 A | 5/1992 | Koike et al. | |
| 5,710,590 A | 1/1998 | Ichige et al. | |
| 5,760,846 A | 6/1998 | Lee | |
| 5,774,591 A | 6/1998 | Black et al. | |
| 5,774,595 A | 6/1998 | Kim | |
| 5,933,535 A | 8/1999 | Lee et al. | |
| 5,969,755 A | 10/1999 | Courtney | |

(Continued)

FOREIGN PATENT DOCUMENTS

EP          0 614 318 A2     9/1994

(Continued)

OTHER PUBLICATIONS

Notification Concerning Transmittal of International Preliminary Report on Patentability, in International Application No. PCT/US2008/000092, pp. 9, mailed Aug. 6, 2009.

(Continued)

*Primary Examiner* — Curtis Kuntz
*Assistant Examiner* — Maria El-Zoobi
(74) *Attorney, Agent, or Firm* — Hamilton, Brook, Smith & Reynolds, P.C.

(57) ABSTRACT

Systems and methods for processing video are provided. Video compression schemes are provided to reduce the number of bits required to store and transmit digital media in video conferencing or videoblogging applications. A photorealistic avatar representation of a video conference participant is created. The avatar representation can be based on portions of a video stream that depict the conference participant. A face detector is used to identify, track and classify the face. Object models including density, structure, deformation, appearance and illumination models are created based on the detected face. An object based video compression algorithm, which uses machine learning face detection techniques, creates the photorealistic avatar representation from parameters derived from the density, structure, deformation, appearance and illumination models.

31 Claims, 8 Drawing Sheets

U.S. PATENT DOCUMENTS

| | | | |
|---|---|---|---|
| 6,307,964 B1 | 10/2001 | Lin et al. | |
| 6,546,117 B1 | 4/2003 | Sun et al. | |
| 6,574,353 B1 | 6/2003 | Schoepflin | |
| 6,611,628 B1 | 8/2003 | Sekiguchi et al. | |
| 6,625,310 B2 | 9/2003 | Lipton et al. | |
| 6,625,316 B1 | 9/2003 | Maeda | |
| 6,661,004 B2 | 12/2003 | Aumond et al. | |
| 6,711,278 B1 | 3/2004 | Gu et al. | |
| 6,731,799 B1 | 5/2004 | Sun et al. | |
| 6,731,813 B1 | 5/2004 | Stewart | |
| 6,738,424 B1 | 5/2004 | Allmen et al. | |
| 6,751,354 B2 | 6/2004 | Foote et al. | |
| 6,774,917 B1 | 8/2004 | Foote et al. | |
| 6,792,154 B1 | 9/2004 | Stewart | |
| 6,870,843 B1 | 3/2005 | Stewart | |
| 6,912,310 B1 | 6/2005 | Park et al. | |
| 6,925,122 B2 | 8/2005 | Gorodnichy | |
| 6,950,123 B2 | 9/2005 | Martins | |
| 7,043,058 B2 | 5/2006 | Cornog et al. | |
| 7,088,845 B2 | 8/2006 | Gu et al. | |
| 7,158,680 B2 | 1/2007 | Pace | |
| 7,162,055 B2 | 1/2007 | Gu et al. | |
| 7,162,081 B2 | 1/2007 | Timor et al. | |
| 7,164,718 B2 | 1/2007 | Maziere et al. | |
| 7,184,073 B2 | 2/2007 | Varadarajan et al. | |
| 7,352,386 B1 | 4/2008 | Shum et al. | |
| 7,415,527 B2 | 8/2008 | Varadarajan et al. | |
| 7,424,157 B2 | 9/2008 | Pace | |
| 7,424,164 B2* | 9/2008 | Gondek et al. | 382/254 |
| 7,426,285 B2 | 9/2008 | Pace | |
| 7,436,981 B2 | 10/2008 | Pace | |
| 7,457,435 B2 | 11/2008 | Pace | |
| 7,457,472 B2 | 11/2008 | Pace et al. | |
| 7,508,990 B2 | 3/2009 | Pace | |
| 7,574,406 B2 | 8/2009 | Varadarajan et al. | |
| 7,630,522 B2* | 12/2009 | Popp et al. | 382/115 |
| 8,036,464 B2 | 10/2011 | Sridhar et al. | |
| 8,065,302 B2 | 11/2011 | Sridhar et al. | |
| 8,068,677 B2 | 11/2011 | Varadarajan et al. | |
| 8,086,692 B2 | 12/2011 | Sridhar et al. | |
| 8,090,670 B2 | 1/2012 | Sridhar et al. | |
| 8,140,550 B2 | 3/2012 | Varadarajan et al. | |
| 2001/0038714 A1 | 11/2001 | Masumoto et al. | |
| 2002/0054047 A1 | 5/2002 | Toyama et al. | |
| 2002/0085633 A1 | 7/2002 | Kim et al. | |
| 2002/0164068 A1 | 11/2002 | Yan | |
| 2002/0196328 A1 | 12/2002 | Piotrowski | |
| 2003/0011589 A1 | 1/2003 | Desbrun et al. | |
| 2003/0063778 A1 | 4/2003 | Rowe et al. | |
| 2003/0103647 A1 | 6/2003 | Rui et al. | |
| 2003/0122966 A1 | 7/2003 | Markman et al. | |
| 2003/0163690 A1 | 8/2003 | Stewart | |
| 2003/0194134 A1 | 10/2003 | Wenzel et al. | |
| 2003/0235341 A1 | 12/2003 | Gokturk et al. | |
| 2004/0013286 A1 | 1/2004 | Viola et al. | |
| 2004/0107079 A1 | 6/2004 | MacAuslan | |
| 2004/0135788 A1 | 7/2004 | Davidson et al. | |
| 2004/0246336 A1 | 12/2004 | Kelly, III et al. | |
| 2006/0029253 A1 | 2/2006 | Pace | |
| 2006/0067585 A1 | 3/2006 | Pace | |
| 2006/0133681 A1 | 6/2006 | Pace | |
| 2006/0177140 A1 | 8/2006 | Pace et al. | |
| 2006/0233448 A1 | 10/2006 | Pace et al. | |
| 2007/0025373 A1 | 2/2007 | Stewart | |
| 2007/0071336 A1 | 3/2007 | Pace | |
| 2009/0067719 A1 | 3/2009 | Sridhar et al. | |
| 2009/0292644 A1 | 11/2009 | Varadarajan et al. | |
| 2010/0008424 A1 | 1/2010 | Pace | |
| 2010/0049739 A1 | 2/2010 | Varadarajan et al. | |
| 2010/0086062 A1 | 4/2010 | Pace | |
| 2010/0167709 A1 | 7/2010 | Varadarajan | |
| 2011/0055266 A1 | 3/2011 | Varadarajan et al. | |
| 2011/0087703 A1 | 4/2011 | Varadarajan et al. | |
| 2011/0182352 A1 | 7/2011 | Pace | |

FOREIGN PATENT DOCUMENTS

| | | |
|---|---|---|
| EP | 1 124 379 A2 | 8/2001 |
| EP | 1 426 898 B1 | 6/2004 |
| EP | 1 779 294 A2 | 5/2007 |
| JP | 5-244585 A | 9/1993 |
| JP | 2001-100731 A | 4/2001 |
| JP | 2001-103493 A | 4/2001 |
| JP | 2002-525735 T | 8/2002 |
| JP | 2004-94917 A | 3/2004 |
| JP | 2006-521048 A | 9/2006 |
| WO | WO 98/27515 | 6/1998 |
| WO | WO 98/59497 | 12/1998 |
| WO | WO 99/26415 | 5/1999 |
| WO | WO 00/16563 | 3/2000 |
| WO | WO 00/45600 | 8/2000 |
| WO | WO02 102084 A1 | 12/2002 |
| WO | WO 03/041396 A1 | 5/2003 |
| WO | WO 2005/055602 A1 | 6/2005 |
| WO | WO 2005/107116 A2 | 11/2005 |
| WO | WO 2006/015092 A2 | 2/2006 |
| WO | WO 2006/034308 A2 | 3/2006 |
| WO | WO 2006/055512 A2 | 5/2006 |
| WO | WO 2006/083567 A1 | 8/2006 |
| WO | WO 2006/105470 A1 | 10/2006 |
| WO | WO 2007/146102 | 12/2007 |
| WO | WO 2008/091483 A2 | 7/2008 |
| WO | WO 2008/091484 | 7/2008 |
| WO | WO 2008/091485 | 7/2008 |
| WO | WO 2010/042486 | 4/2010 |

OTHER PUBLICATIONS

Notification of Transmittal of the International Search Report and the Written Opinion of the International Searching Authority, or the Declaration, for International Application No. PCT/US2008/000090, 19 pp., mailed Aug. 18, 2010.

Jones, M. and P. Viola, "Fast Multi View Face Detection," *Mitsubishi Electrical Laboratories*, Jul. 2003 (10 pp.).

Viola, P. and M. Jones, "Rapid Object Detection using a Boosted Cascade of Simple Features," *Proceedings of the 2001 IEEE Computer Society Conference on Computer Vision and Pattern Recognition*, 2001, vol. 1, pp. 511 518.

Gunsel, B. et al., "Content based access to video objects: Temporal segmentation, visual summarization, and feature extraction," *Signal Processing*, vol. 66, pp. 261 280 (1998).

Piamsa nga, P. and N. Babaguchi, "Motion estimation and detection of complex object by analyzing resampled movements of parts," in *Proc. ICIP '04*, 1 (365 368), Oct. 2004.

Vidal, R. et al., "Generalized principal component analysis (GPCA)", in *Proc. CVPR '03*, 1 (I621-628), Jun. 2003.

Vidal, R. and R. Hartley, "Motion segmentation with missing data using PowerFactorization and GPCA," in *Proc. CVPR 04*, 2 (II-310-316), Jun.-Jul. 2004.

Huang, R. et al., "Sparse representation of images with hybrid linear models," in *Proc. ICIP '04*, 2(1281 1284) Oct. 2004.

Rong, S. et al., "Efficient spatiotemporal segmentation and video object generation for highway surveillance video," in *Proc. IEEE Int'l, Conf. Communications, Circuits and Systems and West Sino Expositions*, 1(580 584), Jun. Jul. 2002.

Toklu, C. et al., "Simultaneous Alpha Map Generation and 2 D Mesh Tracking for Multimedia Applications," *Proceedings of the International Conference on Image Processing: 1997*, (113 116) (Oct. 1997).

Urban, M., "Harris Interest Operator," Jan. 28, 2003, http://cmp.felk.cvut.cz/cmp/courses/dzo/resources/lecture_harris_urban.pdf (23 pp.).

Rehg, J. M. and Witkin, A. P., "Visual Tracking with Deformation Models," *Proc. IEEE Int'l. Conf. on Robotics and Automation*, pp. 844-850 (Apr. 1991).

Kass, Michael, Andrew Witzin, and Demetri Terzopoulos, "Snakes: Active contour Models," *International Journal of Computer Vision* (1988).

Tao, H., et al., "Compression of MPEG-4 Facial Animation Parameters for Transmission of Talking Heads," *IEEE Transactions on Circuits and Systems for Video Technology*, vol. 9, No. 2, pp. 264-276 (Mar. 1999).

Reinders, M.J.T., et al., "Facial Feature Localization and Adaptation of a Generic Face Model for model-Based Coding," *Signal Processing: Image Communication,* No. 7, pp. 57-74 (1995).

Doenges, P. K., "MPEG-4: Audio/Video and Synthetic Graphics/Audio for Mixed Media," *Signal Processing: Image Communication,* No. 9, pp. 433-463 (1997).

PCT International Search Report, for International Application No. PCT/US2008/000091, dated Sep. 23, 2008, 5 pages.

PCT International Search Report, for International Application No. PCT/US2008/000092, dated Sep. 23, 2008, 5 pages.

Invitation to Pay Additional Fees and, Where Applicable, Protest Fee, for International Application No. PCT/US2008/000090, mailed Jun. 2, 2010.

Notification Concerning Transmittal of International Preliminary Report on Patentability (Chapter I of the Patent Cooperation Treaty), for International Application No. PCT/US2008/00090, mailed Sep. 2, 2010.

Antoszczyszyn, P.M., et al., "Tracking of the Motion of Important Facial Features in Model-Based Coding," *Signal Processing,* 66(2):249-260, (Apr. 30, 1998).

Fukuhara, T., et al., "3-D Motion Estimation of Human Head for Model-Based Image Coding," *IEEE Proceedings-I,* 140(1):26-35, (Feb. 1, 1993).

International Search Report for International Application No. PCT/US2009/059653, 8 pp., mailed Feb. 2, 2010.

Written Opinion of the International Searching Authority for International Application No. PCT/US2009/059653, 8 pp., mailed Feb. 2, 2010.

Amit, Yali, *2D Object Detection and Recognition: Models, Algorithms, and Networks,* The MIT Press, Cambridge, Massachusetts, pp. 147-149 (Sections 7.3: Detecting Pose and 7.4: Bibliographical Notes and Discussion) (2002).

Huang, T.S. et al., "Chapter 5: Three-Dimensional Model-Based Image Communication," *Visual Information Representation, Communication, and Image Processing,* Editors: Chen, Chang Wen, et al., Marcel Dekker, Inc., New York, New York, pp. 97-117 (1999).

Extended European Search Report for 06 73 3758.4, dated Mar. 8, 2011 (17 pages).

Extended European Search Report for 06 74 0318.8, dated May 6, 2011 (14 pages).

Fischler, M.A., et al., "Random Sample Consensus: A Paradigm for Model Fitting with Applications to Image Analysis and Automated Cartography," Communications of the Association for Computing Machinery, 24(6):381-395 (1981).

Harris, C., et al., "A Combined Corner and Edge Detector," Alvey Vision Conference, Proceedings of the Alvey Vision Conference, p. 147 (1988).

Irani, M., et al., "Detecting and Tracking Multiple Moving Objects Using Temporal Integration," European Conference on Computer Vision, 282-287 (1992).

Pique, R. et al., "Efficient Face Coding in Video Sequences Combining Adaptive Principal Component Analysis and a Hybrid Codec Approach," Proceedings of International Conference on Acoustics, Speech and Signal Processing, 3:629-632(2003).

Schröder, K., et al., "Combined Description of Shape and Motion in an Object Based Coding Scheme Using Curved Triangles," Proceedings of the International Conference on Image Processing, 2:390-393 (1995).

Tabatabai, A. J., et al., "Motion Estimation Methods for Video Compression-A Review," Journal of the Franklin Institute, 335(8): 1411-1441 (1998).

Wang, Y., "Use of Two-Dimensional Deformable Mesh Structures for Video Coding, Part I—The Synthesis Problem: Mesh-Based Function Approximation and Mapping" IEEE Transactions on Circuits and Systems for Video Technology, 6(6):1051-8215 (1996).

Wang, Y., "Use of Two-Dimensional Deformable Mesh Strucutures for Video Coding, Part II—The Analysis Problem and a Region-Based Coder Employing an Active Mesh Representation" IEEE Transactions on Circuits and.

Shin, J. et al., "Optical flow-based real-time object tracking using non-prior training active feature model," Academic Press Limited, GB, vol. 11, No. 3, pp. 204-218 (Jun. 1, 2005).

Cho, J-H., et al., "Object detection using multi-resolution mosaic in image sequences," Signal Processing. Image Communication, Elsevier Science Publishers, Amsterdam, vol. 20, No. 3, pp. 233-253, (Mar. 1, 2005).

Gorodinchy, et al., "Seeing faces in video by computers. Editorial for Special Issue on Face Processing in Video Sequences," Image and Vision Computing, Guilford, GB, vol. 24, No. 6, pp. 551-556 (Jun. 1, 2006).

Miners, B. W., et al., "Dynamic Facial Expression Recognition Using Fuzzy Hidden Markov Models," Systems, Man and Cybernetics, 2005 IEEE International Conference on, IEEE, Piscataway, N.J., USA, vol. 2, pp. 1417-1422 (Oct. 10, 2005).

Notification Concerning Transmittal of International Preliminary Report on Patentability, in International Application No. PCT/US2008/000091, pp. 9, mailed Aug. 6, 2009.

Dodgson, N. A., "Image resampling," *Technical Report, UCAM-CL-TR-261, ISSN 1476-2986, University of Cambridge, Computer Laboratory,* (264 pp.) (Aug. 1992).

Richardson, I., "Vcodex White Paper: Video Compression Patents," *Vcodex Ltd.,* pp. 3-6 (2008-2011).

Notification Concerning Transmittal of the International Preliminary Report on Patentability for PCT/US2009/059653, mailed Apr. 21, 2011 (10 pages).

Park, et al., "Qualitative Estimation of Camera Motion Parameters From the Linear Composition of Optical Flow," Pattern Recognition: The Journal of the Pattern Recognition Society, 37:767-779 (2004).

* cited by examiner

SYSTEMS AND METHODS FOR PROVIDING PERSONAL VIDEO SERVICES

RELATED APPLICATIONS

This application is the U.S. National Stage of International Application No. PCT/US2008/000092, filed Jan. 4, 2008, which designates the U.S., published in English, and claims the benefit of U.S. Provisional Application Ser. No. 60/881,979 filed Jan. 23, 2007. This application is related to U.S. Provisional Application Ser. No. 60/881,966, titled "Computer Method and Apparatus for Processing Image Data," filed Jan. 23, 2007, U.S. Provisional Application Ser. No. 60/811,890, titled "Apparatus And Method For Processing Video Data," filed Jun. 8, 2006. This application is related to U.S. application Ser. No. 11/396,010 filed Mar. 31, 2006, which is a continuation-in-part of U.S. application Ser. No. 11/336,366 filed Jan. 20, 2006, which is a continuation-in-part of U.S. application Ser. No. 11/280,625 filed Nov. 16, 2005, which is a continuation-in-part of U.S. application Ser. No. 11/230,686, filed Sep. 20, 2005, which is a continuation-in-part of U.S. application Ser. No. 11/191,562, filed Jul. 28, 2005, now U.S. Pat. No. 7,158,680. The entire teachings of the above applications are incorporated herein by reference.

BACKGROUND

With the recent surge in popularity of digital video, the demand for video compression has increased dramatically. Video compression reduces the number of bits required to store and transmit digital media. Video data contains spatial and temporal redundancy, and these spatial and temporal similarities can be encoded by registering differences within a frame (spatial) and between frames (temporal). The hardware or software that performs compression is called a codec (coder/decoder). The codec is a device or software capable of performing encoding and decoding on a digital signal. As data-intensive digital video applications have become ubiquitous, so has the need for more efficient ways to encode signals. Thus, video compression has now become a central component in storage and communication technology.

Codecs are often used in many different technologies, such as videoconferencing, videoblogging and other streaming media applications, e.g. video podcasts. Typically, a videoconferencing or videoblogging system provides digital compression of audio and video streams in real-time. One of the problems with videoconferencing and videoblogging is that many participants suffer from appearance consciousness. The burden of presenting an acceptable on-screen appearance, however, is not an issue in audio-only communication.

Another problem videoconferencing and video blogging presents is that the compression of information can result in decreased video quality. The compression ratio is one of the most important factors in video conferencing because the higher the compression ratio, the faster the video conferencing information is transmitted. Unfortunately, with conventional video compression schemes, the higher the compression ratio, the lower the video quality. Often, compressed video streams result in poor images and poor sound quality.

In general, conventional video compression schemes suffer from a number of inefficiencies, which are manifested in the form of slow data communication speeds, large storage requirements, and disturbing perceptual effects. These impediments can impose serious problems to a variety of users who need to manipulate video data easily, efficiently, and without sacrificing quality, which is particularly important in light of the innate sensitivity people have to some forms of visual information.

In video compression, a number of critical factors are typically considered including: video quality and the bit rate, the computational complexity of the encoding and decoding algorithms, robustness to data losses and errors, and latency. As an increasing amount of video data surges across the Internet, not just to computers but also televisions, cell phones and other handheld devices, a technology that could significantly relieve congestion or improve quality represents a significant breakthrough.

SUMMARY

Systems and methods for processing video are provided to create computational and analytical advantages over existing state-of-the-art methods. Video compression schemes are provided to reduce the number of bits required to store and transmit digital media in video conferencing or videoblogging applications. A photorealistic avatar representation of a video conference participant is created. The avatar representation can be based on portions of a video stream that depict the conference participant. An object based video compression algorithm, can use a face detector, such as a Violla-Jones face detector, to detect, track and classify the face of the conference participant. Object models for structure, deformation, appearance and illumination are created based on the detected face in conjunction with registration of pre-defined object models for general faces. These object models are used to create an implicit representation, and thus, generate the photorealistic avatar representation of the video conference participant.

This depiction can be a lifelike version of the face of the video conference participant. It can be accurate in terms of the user's appearance and expression. Other parts of the originally captured frame can be depicted, possibly with lower accuracy. A short calibration session, executed once per unique user, can take place. This would enable the system to initialize the compression algorithms and create the object models. Preferably, subsequent video conferencing sessions would not need additional calibration.

Should the user require a video representation that is as faithful as a conventional video depiction, the system might require an additional calibration period to adjust the stored models to better match the user's appearance. Otherwise, the user may prefer to use a preferred object model rather than a current object model. The preferred model may be some advantageous representation of the user, for example a calibration session with best lighting and a neater appearance of the user. Another preferred object model would be a calibration model that has been "re-lit" and with "smoothing" applied to the face—both processing steps to achieve a "higher quality" representation of the subject.

A video conferencing/blogging system can be provided using client server framework. A user at a client node can initiate a video conferencing session, communicating through the use of a video camera and headset. The photorealistic avatar representation of each user's face can be generated. The photorealistic avatar representation created can be an implicit representation of the face of the video conference participant.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
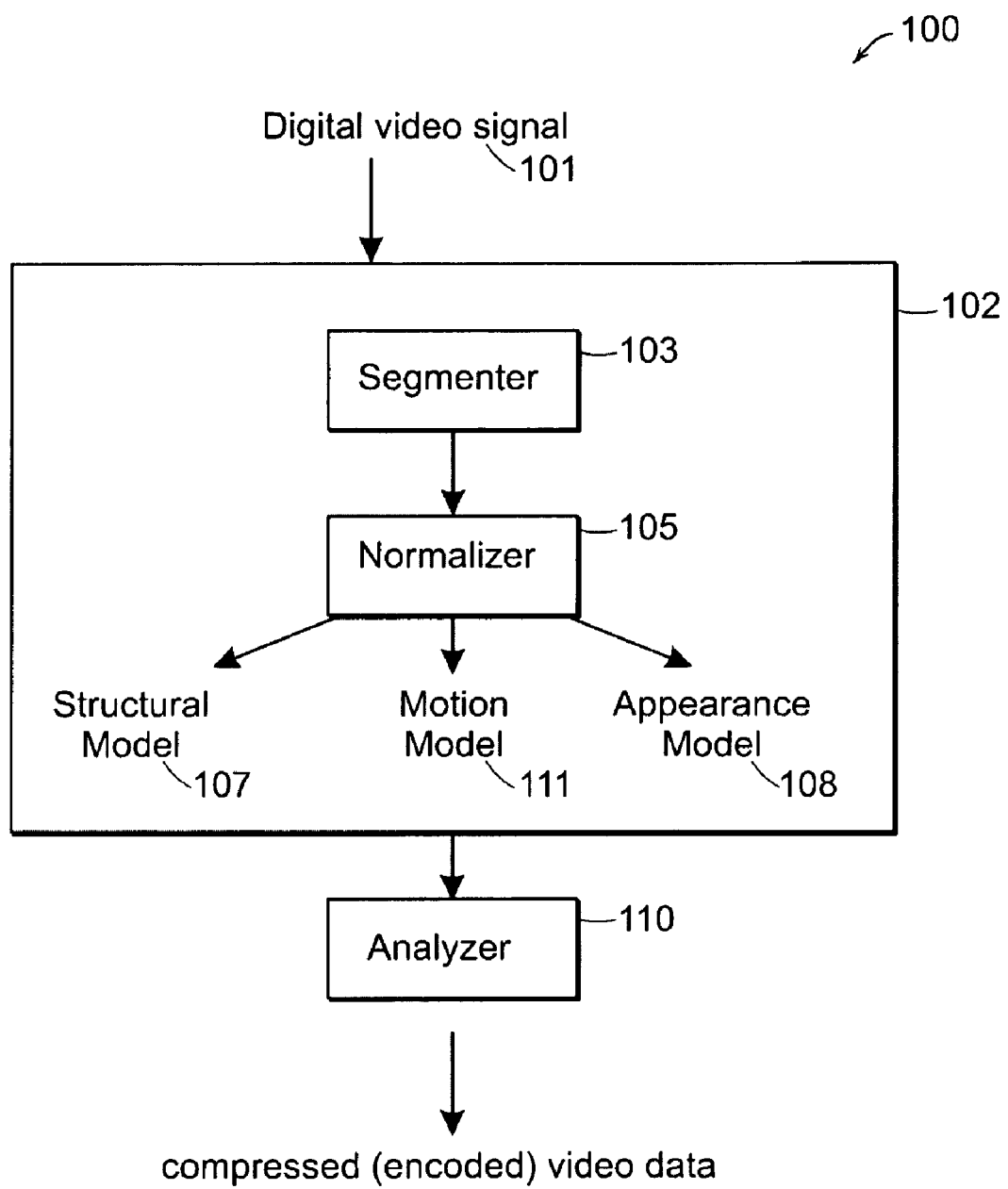
FIG. 1 is a block diagram of a video compression (image processing, generally) system employed in embodiments of the present invention.

A description of example embodiments of the invention follows.

Creating Object Models

In video signal data, frames of video are assembled into a sequence of images. The subject of the video is usually a three-dimensional scene projected onto the camera's two-dimensional imaging surface. In the case of synthetically generated video, a "virtual" camera is used for rendering; and in the case of animation, the animator performs the role of managing this camera frame of reference. Each frame, or image, is composed of picture elements (pels) that represent an imaging sensor response to the sampled signal. Often, the sampled signal corresponds to some reflected, refracted, or emitted energy, (e.g. electromagnetic, acoustic, etc.) sampled through the camera's components on a two dimensional sensor array. A successive sequential sampling results in a spatiotemporal data stream with two spatial dimensions per frame and a temporal dimension corresponding to the frame's order in the video sequence. This process is commonly referred to as the "imaging" process.

The invention provides a means by which video signal data can be efficiently processed into one or more beneficial representations. The present invention is efficient at processing many commonly occurring data sets in the video signal. The video signal is analyzed, and one or more concise representations of that data are provided to facilitate its processing and encoding. Each new, more concise data representation allows reduction in computational processing, transmission bandwidth, and storage requirements for many applications, including, but not limited to: encoding, compression, transmission, analysis, storage, and display of the video signal. Noise and other unwanted parts of the signal are identified as lower priority so that further processing can be focused on analyzing and representing the higher priority parts of the video signal. As a result, the video signal can be represented more concisely than was previously possible. And the loss in accuracy is concentrated in the parts of the video signal that are perceptually unimportant.

As described in U.S. application Ser. No. 11/336,366 filed Jan. 20, 2006 and U.S. application No. 60/881,966, titled "Computer Method and Apparatus for Processing Image Data," filed Jan. 23, 2007, the entire teachings of which are incorporated by reference, video signal data is analyzed and salient components are identified. The analysis of the spatiotemporal stream reveals salient components that are often specific objects, such as faces. The identification process qualifies the existence and significance of the salient components, and chooses one or more of the most significant of those qualified salient components. This does not limit the identification and processing of other less salient components after or concurrently with the presently described processing. The aforementioned salient components are then further analyzed, identifying the variant and invariant subcomponents. The identification of invariant subcomponents is the process of modeling some aspect of the component, thereby revealing a parameterization of the model that allows the component to be synthesized to a desired level of accuracy In one embodiment, the PCA/wavelet encoding techniques are applied to a preprocessed video signal to form a desired compressed video signal. The preprocessing reduces complexity of the video signal in a manner that enables principal component analysis (PCA)/wavelet encoding (compression) to be applied with increased effect. PCA/wavelet encoding is discussed at length in co-pending application, U.S. application Ser. No. 11/336,366 filed Jan. 20, 2006 and U.S. application No. 60/881,966, titled "Computer Method and Apparatus for Processing Image Data," filed Jan. 23, 2007.

FIG. 1 is a block diagram of an example image processing system 100 embodying principles of the present invention. A source video signal 101 is input to or otherwise received by a preprocessor 102. The preprocessor 102 uses bandwidth consumption or other criteria, such as a face/object detector to determine components of interest (salient objects) in the source video signal 101. In particular, the preprocessor 102 determines portions of the video signal which use disproportionate bandwidth relative to other portions of the video signal 101. One method of segmenter 103 for making this determination is as follows.

Segmenter 103 analyzes an image gradient over time and/or space using temporal and/or spatial differences in derivatives of pels. For the purposes of coherence monitoring, parts of the video signal that correspond to each other across sequential frames of the video signal are tracked and noted. The finite differences of the derivative fields associated with those coherent signal components are integrated to produce the determined portions of the video signal which use disproportionate bandwidth relative to other portions (i.e., determines the components of interest). In a preferred embodiment, if a spatial discontinuity in one frame is found to correspond to a spatial discontinuity in a succeeding frame, then the abruptness or smoothness of the image gradient is analyzed to yield a unique correspondence (temporal coherency). Further, collections of such correspondences are also employed in the same manner to uniquely attribute temporal coherency of discrete components of the video frames. For an abrupt image gradient, an edge is determined to exist. If two such edge defining spatial discontinuities exist then a corner is defined. These identified spatial discontinuities are combined with the gradient flow, which produces motion vectors between corresponding pels across frames of the video data. When a motion vector is coincident with an identified spatial discontinuity, then the invention segmenter 103 determines that a component of interest (salient object) exists.

Other segmentation techniques are suitable for implementing segmenter 103. Returning to FIG. 1, once the preprocessor 102 (segmenter 103) has determined the components of interest (salient objects) or otherwise segmented the same from the source video signal 101, a normalizer 105 reduces the complexity of the determined components of interest. Preferably, the normalizer 105 removes variance of global motion and pose, global structure, local deformation, appearance, and illumination from the determined components of interest. The normalization techniques previously described in the related patent applications stated herein are utilized toward this end. This results in the normalizer 105 establishing object models, such as a structural model 107 and an appearance model 108 of the components of interest.

The structural object model 107 may be mathematically represented as:

$$SM(\sigma) = \sum_{x,y} [(v_{x,y} + \Delta_t) + Z] \quad \text{Equation 1}$$

where $\sigma$ is the salient object (determined component of interest) and SM( ) is the structural model of that object;

$v_{x,y}$ are the 2D mesh vertices of a piece-wise linear regularized mesh over the object $\sigma$ registered over time;

$\Delta_t$ are the changes in the vertices over time t representing scaling (or local deformation), rotation and translation of the object between video frames; and Z is global motion.

From Equation 1, a global rigid structural model, global motion, pose, and locally derived deformation of the model can be derived. Known techniques for estimating structure from motion are employed and are combined with motion estimation to determine candidate structures for the structural parts (component of interest of the video frame over time). This results in defining the position and orientation of the salient object in space and hence provides a structural model 107 and a motion model 111.

The appearance model 108 then represents characteristics and aspects of the salient object which are not collectively modeled by the structural model 107 and the motion model 111. In one embodiment, the appearance model 108 is a linear decomposition of structural changes over time and is defined by removing global motion and local deformation from the structural model 107. Applicant takes object appearance at each video frame and using the structural model 107 and reprojects to a "normalized pose." The "normalized pose" will also be referred to as one or more "cardinal" poses. The reprojection represents a normalized version of the object and produces any variation in appearance. As the given object rotates or is spatially translated between video frames, the appearance is positioned in a single cardinal pose (i.e., the average normalized representation). The appearance model 108 also accounts for cardinal deformation of a cardinal pose (e.g., eyes opened/closed, mouth opened/closed, etc.) Thus appearance model 108 AM($\sigma$) is represented by cardinal pose $P_c$ and cardinal deformation $\Delta_c$ in cardinal pose $P_c$, $$AM(\sigma) = \sum_t (P_c + \Delta_c P_c) \quad \text{Equation 2}$$

The pels in the appearance model 108 are preferably biased based on their distance and angle of incidence to camera projection axis. Biasing determines the relative weight of the contribution of an individual pel to the final formulation of a model. Therefore, preferably, this "sampling bias" can factor into all processing of all models. Tracking of the candidate structure (from the structural model 107) over time can form or enable a prediction of the motion of all pels by implication from a pose, motion, and deformation estimates.

Further, with regard to appearance and illumination modeling, one of the persistent challenges in image processing has been tracking objects under varying lighting conditions. In image processing, contrast normalization is a process that models the changes of pixel intensity values as attributable to changes in lighting/illumination rather than it being attributable to other factors. The preferred embodiment estimates a salient object's arbitrary changes in illumination conditions under which the video was captured (i.e., modeling, illumination incident on the object). This is achieved by combining principles from Lambertian Reflectance Linear Subspace (LRLS) theory with optical flow. According to the LRLS theory, when an object is fixed—preferably, only allowing for illumination changes, the set of the reflectance images can be approximated by a linear combination of the first nine spherical harmonics; thus the image lies close to a 9D linear subspace in an ambient "image" vector space. In addition, the reflectance intensity for an image pixel (x,y) can be approximated as follows.

$$I(x, y) = \sum_{i=0,1,2,\ j=-i,-i+1\ldots\ i-1,i} l_{ij} b_{ij}(n),$$

Using LRLS and optical flow, expectations are computed to determine how lighting interacts with the object. These expectations serve to constrain the possible object motion that can explain changes in the optical flow field. When using LRLS to describe the appearance of the object using illumination modeling, it is still necessary to allow an appearance model to handle any appearance changes that may fall outside of the illumination model's predictions.

Other mathematical representations of the appearance model 108 and structural model 107 are suitable as long as the complexity of the components of interest is substantially reduced from the corresponding original video signal but saliency of the components of interest is maintained.

Returning to FIG. 1, PCA/wavelet encoding is then applied to the structural object model 107 and appearance object model 108 by the analyzer 110. More generally, analyzer 110 employs a geometric data analysis to compress (encode) the video data corresponding to the components of interest. The resulting compressed (encoded) video data is usable in the FIG. 2 image processing system. In particular, these object models 107, 108 can be stored at the encoding and decoding sides 232, 236 of FIG. 2. From the structural model 107 and appearance model 108, a finite state machine can be generated. The conventional coding 232 and decoding 236 can also be implemented as a conventional Wavelet video coding decoding scheme.

PCA encoding is applied to the normalized pel data on both sides 232 and 236, which builds the same set of basis vectors on each side 232, 236. In a preferred embodiment, PCA/wavelet is applied on the basis function during image processing to produce the desired compressed video data. Wavelet techniques (DWT) transform the entire image and sub-image and linearly decompose the appearance model 108 and structural model 107 then this decomposed model is truncated gracefully to meet desired threshold goals (ala EZT or SPIHT). This enables scalable video data processing unlike systems/methods of the prior art due to the "normalize" nature of video data.

Figure 2:
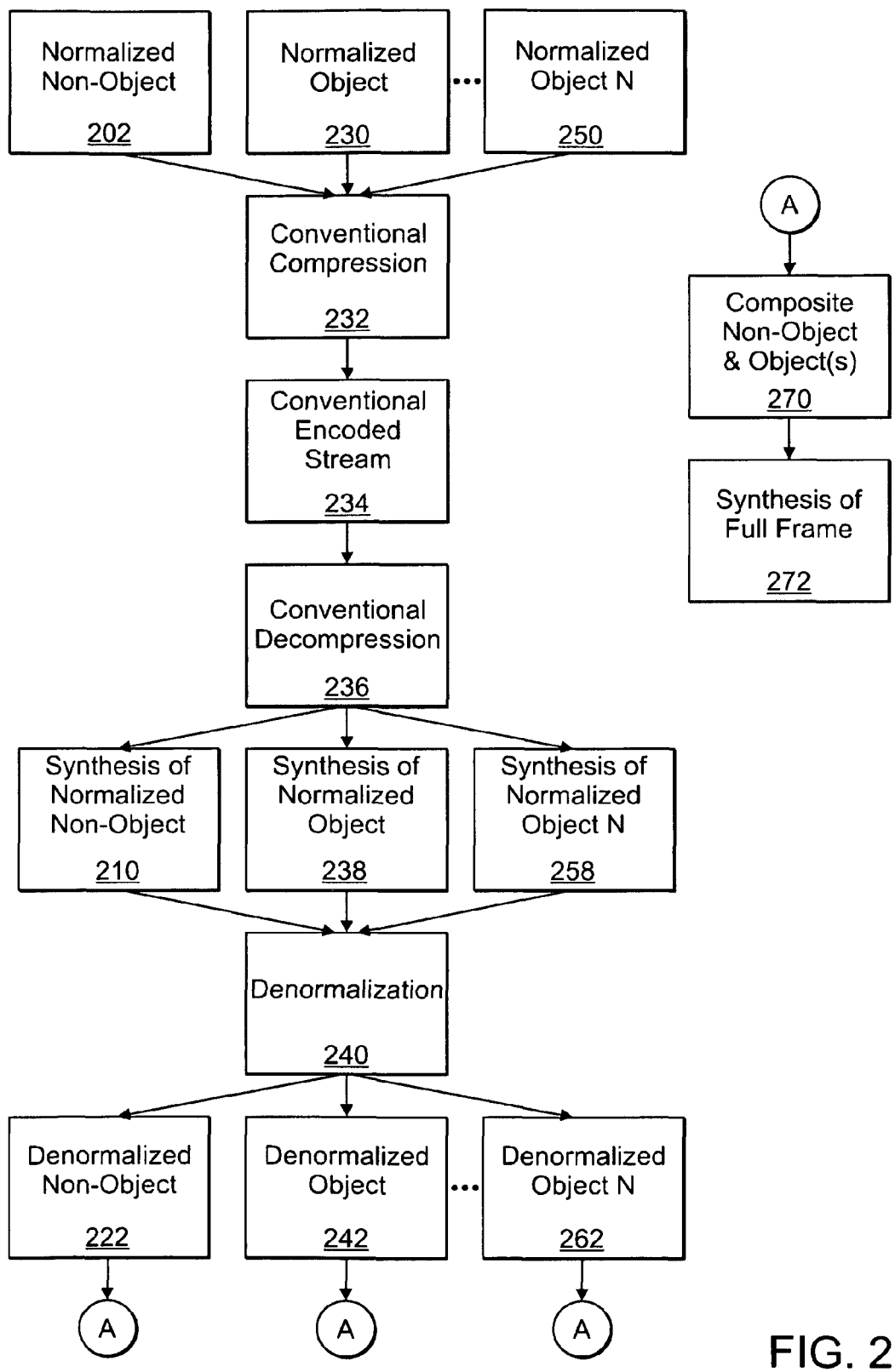
FIG. 2 is a block diagram illustrating the hybrid spatial normalization compression method employed in embodiments of the present invention.

As shown in FIG. 2, the previously detected object instances in the uncompressed video streams for one or more objects 230, 250, are each processed with a separate instance of a conventional video compression method 232. Additionally, the non-object 202 resulting from the segmentation of the objects 230, 250, is also compressed using conventional video compression 232. The result of each of these separate compression encodings 232 are separate conventional encoded streams for each 234 corresponding to each video stream separately. At some point, possibly after transmission, these intermediate encoded streams 234 can be decompressed (reconstructed) at the decoder 236 into a synthesis of the normalized non-object 210 and a multitude of objects 238, 258. These synthesized pels can be de-normalized 240 into their de-normalized versions 222, 242, 262 to correctly position the pels spatially relative to each other so that a compositing process 270 can combine the object and non-object pels into a synthesis of the full frame 272.

Creating a Photorealistic Avatar Representation

Figure 3:
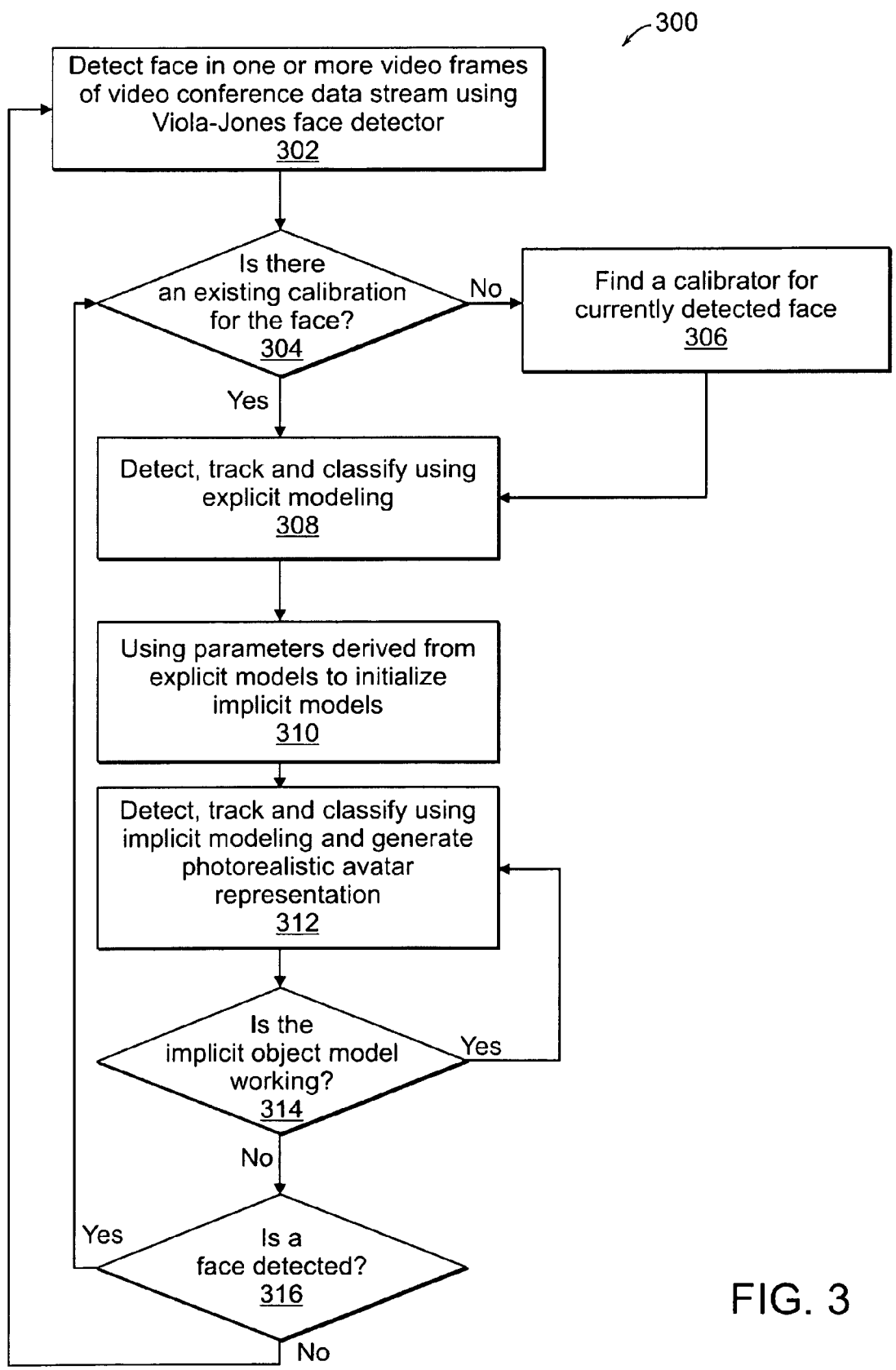
FIG. 3 is a flow diagram illustrating the process for creating a photorealistic avatar representation of a conference participant in a preferred embodiment.

FIG. 3 is a flow diagram illustrating the steps taken by the video conferencing photorealistic avatar generation system 300. This system 300 creates a photorealistic avatar representation of a video conference or video blog participant. As shown in FIG. 3, at 302, a face of one of the video conference participants is detected from one or more video frames of the video conference data stream. The face is detected using the Viola-Jones face detector (or any other face detector).

At 304, the system 100 determines whether the face has been calibrated before. If there is no existing calibration, then at 306 the face is calibrated. Calibration information can include information about face orientation (x, y positions specifying where the face is centered), scale information, and structure, deformation, appearance and illumination information. These parameters can be derived using a hybrid three-dimensional morphable model and LRLS algorithm and the structure, deformation, appearance and illumination models. These models are discussed in U.S. application Ser. No. 11/336,366 filed Jan. 20, 2006 and U.S. application No. 60/881,966, titled "Computer Method and Apparatus for Processing Image Data," filed Jan. 23, 2007, the entire teachings of which are incorporated by reference. Other known modeling technologies may also be used to determine these parameters, such as three-dimensional morphable modeling, active appearance models, etc. These approximations can be used to estimate the pose and structure of the face, and the illumination conditions for each frame in the video. Once the structure, deformation, appearance and illumination basis (e.g. calibration information) for the individual's face has been resolved, then at 308, these explicit models can be used to detect, track and model the individual's face.

At 310, these parameters (e.g. structure, deformation, appearance and illumination basis) can be used to initialize the implicit modeling. The implicit modeling builds its model relative to the information obtained from the explicit modeling and provides a compact encoding of the individual's face. The parameters obtained from the explicit modeling are used as a ground truth for estimating the implicit model. For example, the explicit modeling parameters are used to build expectations about how lighting interacts with the structure of the face and then the face is sampled, these constraints provide a means of limiting the search space for the implicit algorithm. At 312, the individual's face is detected, tracked and classified using the implicit model, and a photorealistic avatar representation is generated. The frames generated using the implicit modeling use less encoding per frame and require fewer parameters than the explicit model. The photorealistic avatar representation is a synthetic representation of the face (e.g. a proxy avatar) of the conference participant. The synthetic representation fidelity can range from a faithful representation of the participant in the original video capture all the way to a representation supported by a previous calibration session.

The system 300 performs periodic checking to ensure that it is basing its modeling on realistic approximations. Thus, at step 314, the system 300 checks to confirm that its implicit object modeling is working properly. The system may determine that the implicit object modeling is working if the reprojection error is low for a certain amount of time. If the reprojection error is low and there is significant amount of motion, then it is likely that the implicit object modeling is working properly. If, however, the reprojection error is high, then the system 300 may determine that the implicit modeling is not working optimally. Similarly, if the system 300 detects a disproportional amount of bandwidth, the system may determine that the implicit modeling is not working optimally.

If it is determined that the implicit modeling is not working, then at step 316, the system 300 checks to determine whether a face can be detected. If a face can be detected, then at step 304, the system 300 finds the existing calibration information for the face and proceeds accordingly. If a face cannot be detected, then the system proceeds to step 302 to detect the face using the Viola-Jones face detector.

In another preferred embodiment, the present invention uses the explicit modeling to re-establish the implicit modeling. The explicit modeling re-establishes the model parameters necessary to re-initialize the implicit model. The full re-establishment involving running the face detector is performed if the explicit modeling cannot re-establish modeling of the participant.

It should be noted that face detection leads can use implicit modeling for calibration. In this case, the implicit model is used to "calibrate" the explicit model. Then, the explicit model starts it's processing, which then leads to an initialization of the implicit model as well.

Figure 4:
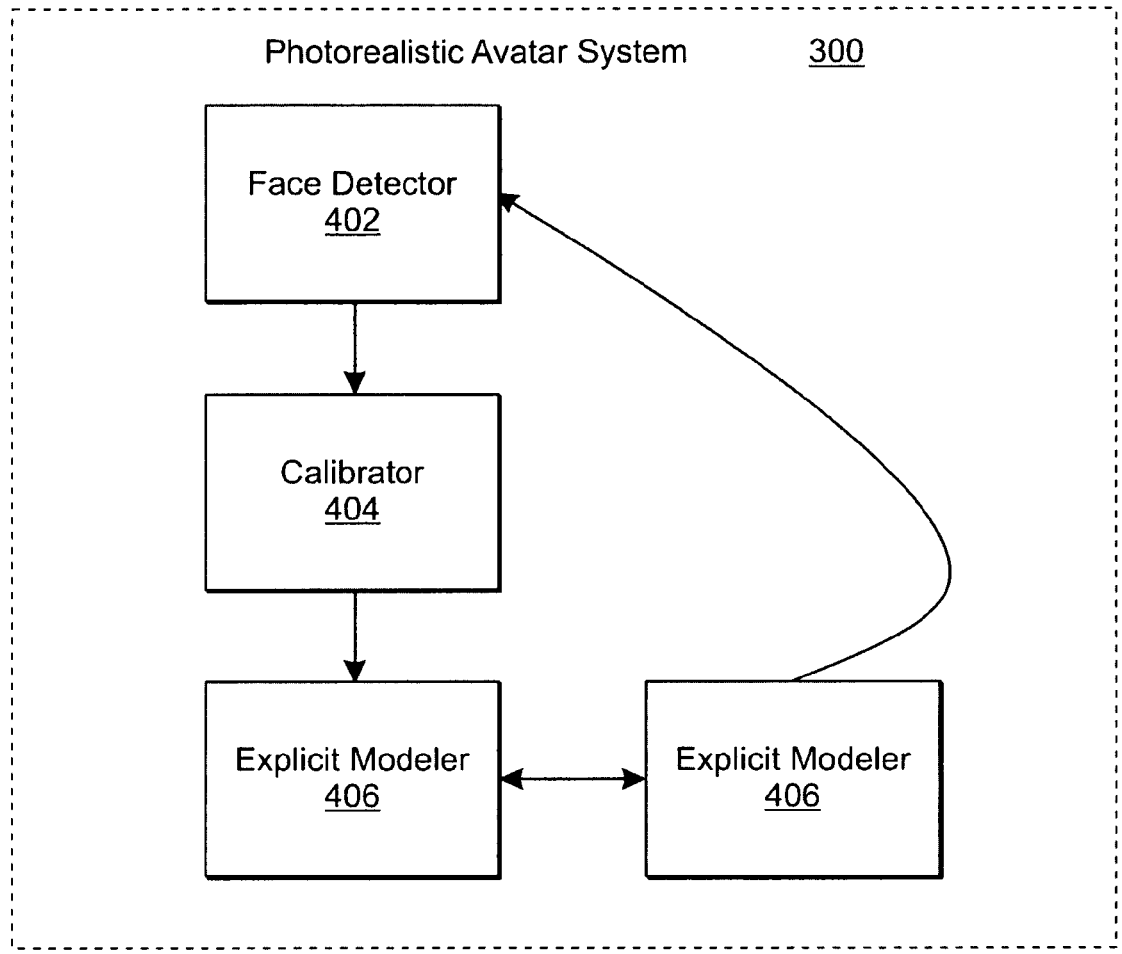
FIG. 4 is a block diagram illustrating an example of the system components used in connection with generating photorealistic avatar.

This periodic checking enables the system 300 to reconfirm that it is in fact modeling a real object, a human face, and causes the system 300 to reset its settings periodically. This arrangement provides a tight coupling between the face detector 402, the calibrator 404, the explicit modeler 406 and the implicit modeler 408. In this way, periodically, the feedback from the explicit modeler 406 is used to reinitialize the implicit modeler 408. A block diagram illustrating an example implementation of this system 300 is shown in FIG. 4.

Photorealistic Avatar Preferences

The photorealistic avatar generation system 300 can provide a host of preferences to conference participants to make their video conference experience more enjoyable. For example, a conference participant can select a preference to require that their photorealistic avatar representation always look directly into camera, such that it appears that the avatar representation is looking directly at the other conference participant. Since the modeling employed allows for the re-posing of any model relative to a virtual camera, the gaze adjustment required for non-co-located cameras and monitors can be compensated for. The conference participant can also select a specific background model. By selecting a consistent background model, the system 300 is able to provide an even more efficient compressed version the video stream. The model may be a predefined background or a low-resolution of the actual background, for example. During face detection and calibration, the conference participant can also customize features associated with their personal attributes in their photorealistic avatar representation, such as removal of wrinkles, selection of hair style/effects, selection of clothing, etc.

By providing a photorealistic avatar representation of the conference participant, the system 300 provides an added layer of security that is not typically available in conventional video conference systems. In particular, because the photorealistic avatar representation is a synthetic representation, the conference participant does not need to worry about the other conference participant knowing potentially confidential information, such as confidential documents that the conference participant is looking at during the video conference, or other confidential information that might be derived by being able to view the specific environment in which video conference is being recorded.

Video Conferencing System

Figure 5A:
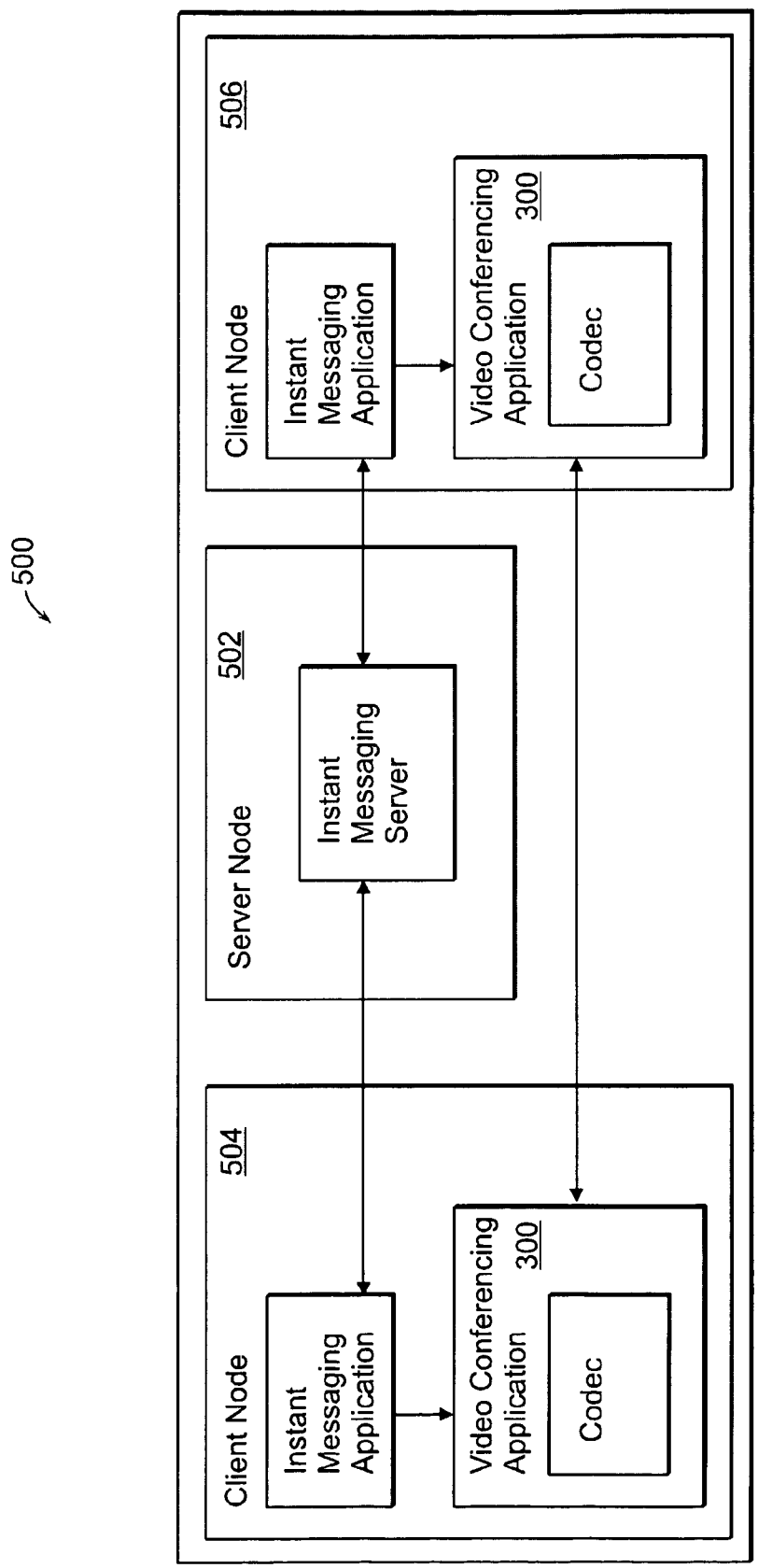
FIG. 5A is a schematic diagram illustrating an example of a video conferencing system of the present invention using an instant messaging server.

FIG. 5A is a diagram illustrating an example of a asynchronous or near-synchronous video conferencing system 500 using an asynchronous or near-synchronous video conferencing server, referred to hereafter as an instant messaging server 502. In this example, a three node network is shown with the instant messaging server 502 and two client machines 504, 506. A user sitting at each machine 504, 506 would be able to initiate a video conferencing session, communicating through the use of a video camera and headset. A photorealistic avatar representation of each user's face would appear in front of each user. This depiction is intended to be accurate in terms of the user's appearance and expression. Other parts of the originally captured frame will be depicted, preferably at a lower accuracy. A short calibration session, executed once per unique user, would take place. This would enable the system to initialize the compression algorithms and create the object models. Subsequent video conferencing sessions would most likely not require additional calibration. Each user can "play" the sequence of asynchronous communication in the order of interchange. In this way, each user can cue the session recording based on user input, detected speech, or some other cue. Additionally, this interaction allows for many simultaneous "conversations" to occur without the "interruptions" that might occur with a fully synchronous scenario.

The asynchronous or semi-synchronous messaging system environment 500 provides a means by which multiple participants are able to interact with each other. This is an important element of usability. The instant messaging session aspect allows the users to "edit" their own video, and review it prior to "sending" it to the other side. There is an aspect of control and also bandwidth reduction that is critical. The editing and control aspects may also be used to generate "higher" quality video segments that can then later be used for other purposes (e.g. by associating the phonemes, or audio phrase patterns, in the video, a video session can be provided without a camera, by using "previous" segments stitched together.)

Figure 5B:
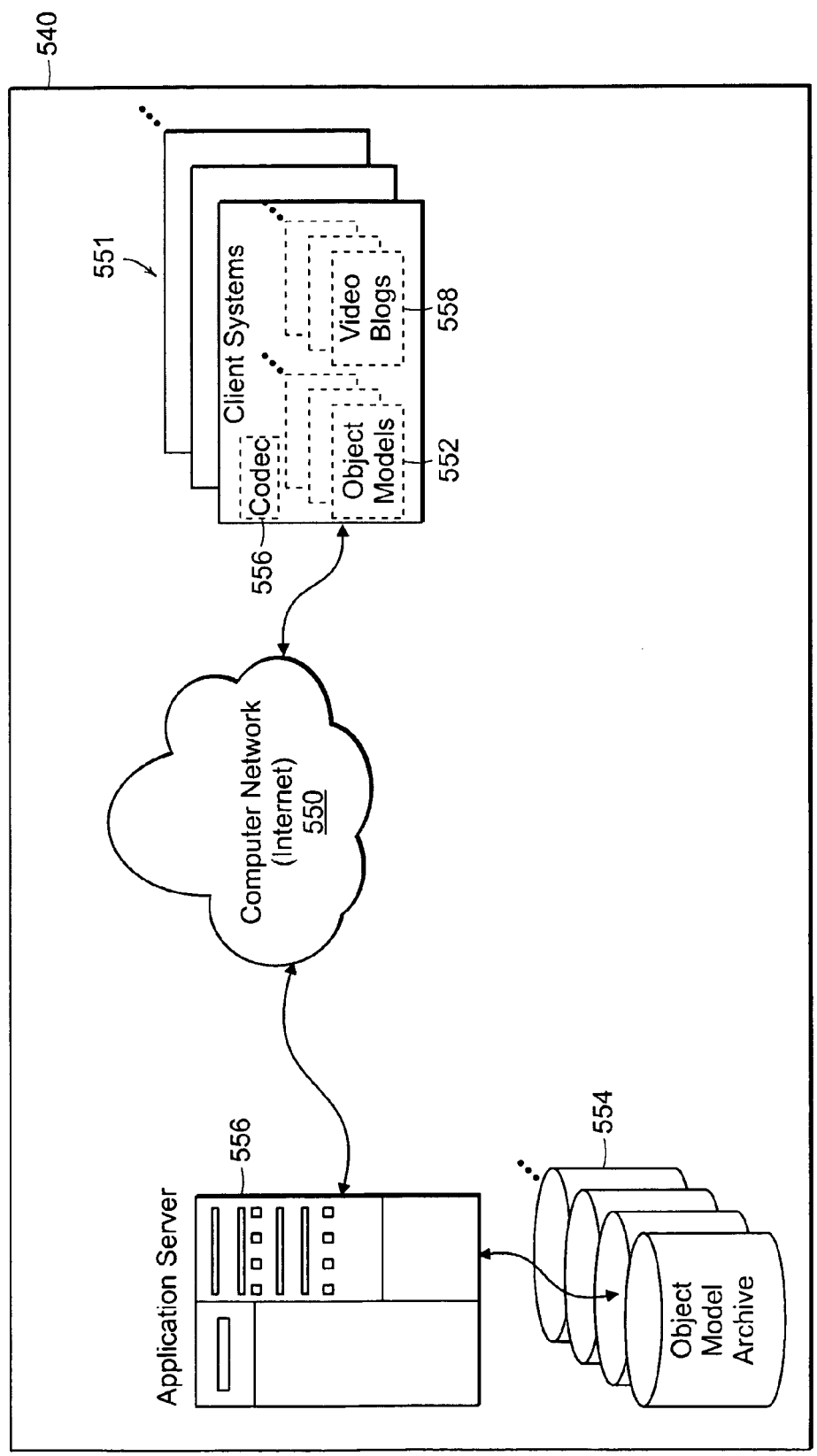
FIG. 5B is a schematic diagram illustrating an example of a video conferencing/blogging system of the present invention.

FIG. 5B is a diagram illustrating an example of a video conferencing/blogging system 540. In this example, client systems 551 connect to the application server 556, which hosts the photorealistic avatar generation system 300 referenced in FIGS. 3 and 4. The application server 556 can store previously generated object (density, structure, appearance, illumination, etc.) models 552 in the object model archive 554. These object models 552 are created to generate the photorealistic avatar representation for users of the system 540 as discussed above in FIGS. 3 and 4. The photorealistic avatar representation can be streamed for video blogging (vlogs) 558 to the client systems 551.

Processing Environment

Figure 6:
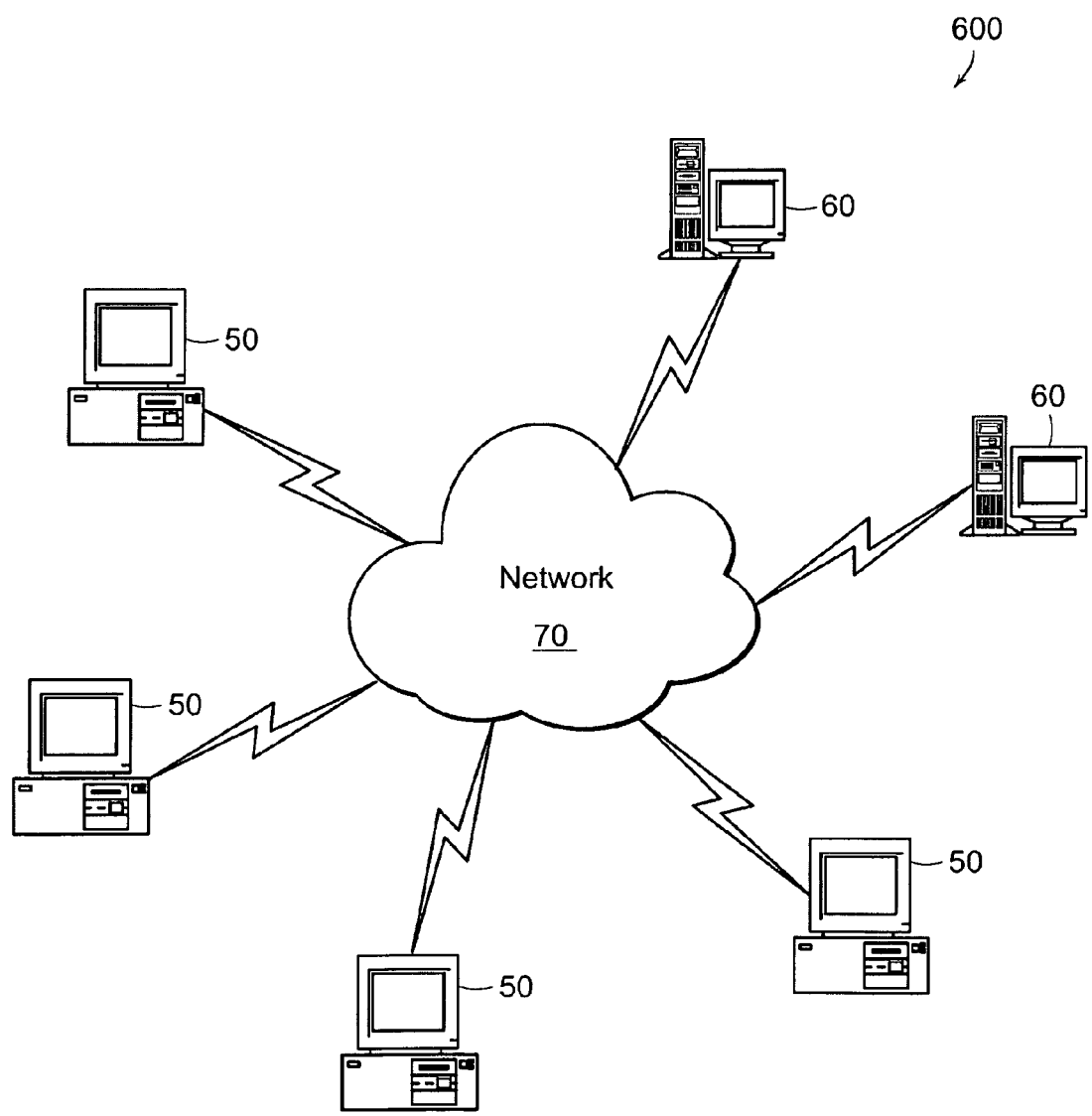
FIG. 6 is a schematic illustration of a computer network or similar digital processing environment in which embodiments of the present invention may be implemented.

FIG. 6 illustrates a computer network or similar digital processing environment 600 in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
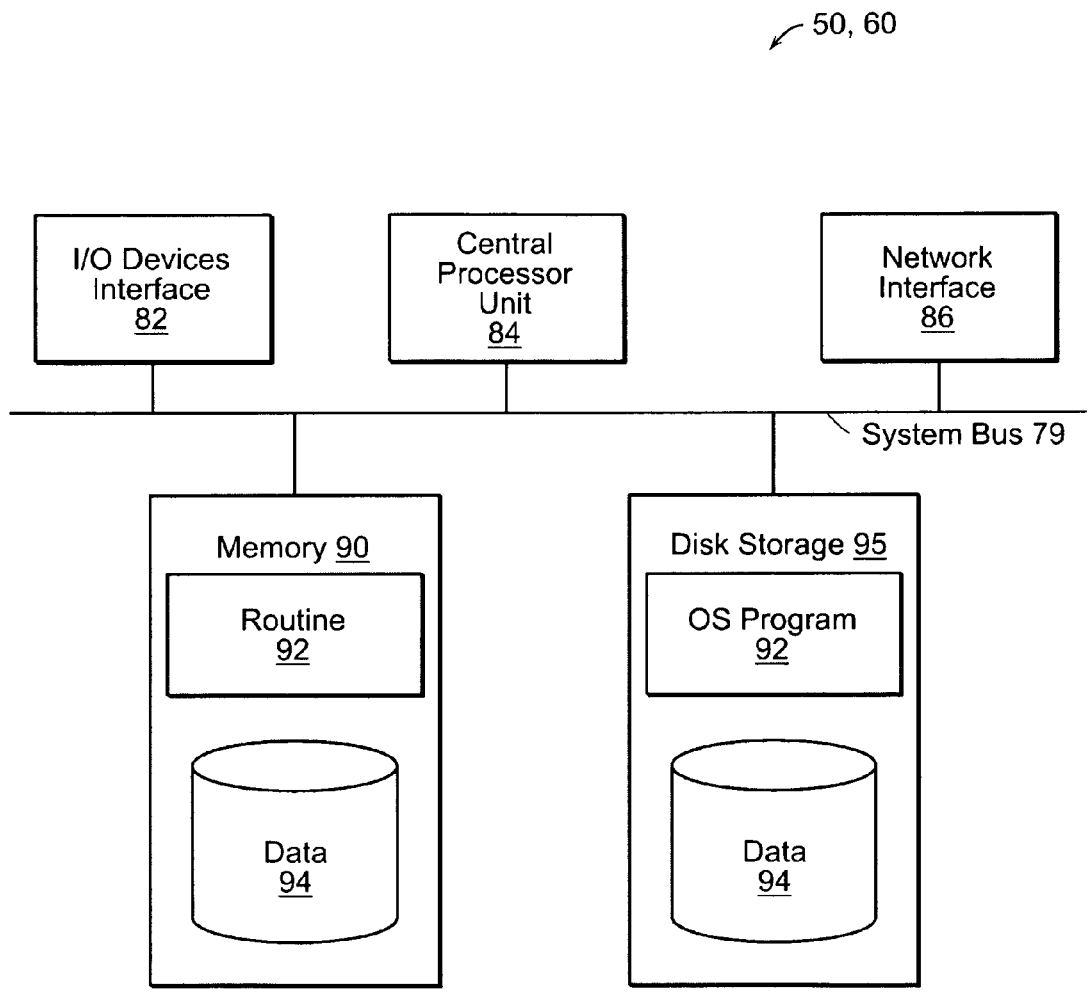
FIG. 7 is a block diagram of the internal structure of a computer of the network of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is an Input/Output (I/O) device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., personal video service). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product, including a computer readable medium (e.g., a removable storage medium, such as one or more DVD-ROM's, CD-ROM's, diskettes, tapes, etc.) that provides at least a portion of the software instructions for the invention system. Computer program product can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network, such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product is a propagation medium that the computer system may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer networks illustrated in FIGS. 5A, 5B, 6 and 7 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Some examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code are retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method of video conferencing, the method comprising the steps of:
    detecting a human face of a video conference participant depicted in portions of a video stream;
    creating by explicitly modeling one or more explicit object models to model the face of the video conference participant;
    generating one or more implicit object models relative to parameters obtained from the explicit object models to facilitate creation of a compact encoding of the video conference participant's face;
    using the implicit object model, creating a photorealistic avatar representation of the video conference participant;
    periodically checking to determine whether the implicit object model is working optimally; and
    responding to a determination that the implicit object model is not working by processing the step of detecting a human face of a video conference participant and in response to detecting a human face, searching for existing calibration information for the detected human face.

2. A method for providing video conferencing as in claim 1 wherein the face of the video conference participant is detected and tracked using a Viola/Jones face detection algorithm.

3. A method for providing video conferencing as in claim 1 wherein the implicit object models provide an implicit representation of the face of the video conference participant.

4. A method for providing video conferencing as in claim 3 wherein the implicit representation of the video conference participant is a simulated representation of the face of the video conference participant.

5. A method for providing video conferencing as in claim 3 wherein the detecting and tracking comprise using a Viola/Jones face detection algorithm further includes the steps of:
    identifying corresponding elements of at least one object associated with the face in two or more video frames from the video stream; and
    tracking and classifying the corresponding elements to identify relationships between the corresponding elements based on previously calibrated and modeled faces.

6. A method for providing video conferencing as in claim 1 wherein the explicit object models include one or more object models for structure, deformation, pose, motion, illumination, and appearance.

7. A video conferencing system comprising:
    a face detector configured to detect a face of a video conference participant in a video stream;
    a calibrator configured to generate a calibration model calibrating the face of the video conference participant;
    an explicit object modeler configured to generate one or more explicit object models, in combination with the calibrator and face detector, the explicit object models modeling portions of the video stream depicting the face of the video conference participant based on the calibration model;
    an implicit object modeler configured to build one or more implicit object models relative to parameters from the explicit object models to facilitate creation of a compact encoding of the participant's face;
    the system operable to generate a photorealistic avatar representation of the video conference participant from the implicit object model;

the system operable to periodically check to determine whether the implicit object model is working optimally; and the system operable to respond to a determination that the implicit object model is not working by using the face detector to detect a face of a video conference participant and responding to the face detector detecting a face by searching for an existing calibration model for the detected face.

8. A method for providing video conferencing as in claim 1 wherein the implicit object models are configured using parameters obtained from the explicit object models, such that the explicit object model parameters are used as a ground truth for estimating portions of the video stream with the implicit object models.

9. A method for providing video conferencing as in claim 8 wherein the explicit object model parameters are used to define expectations about how lighting interacts with the structure of the face of the video conference participant.

10. A method for providing video conferencing as in claim 8 wherein the explicit object model parameters are used to limit a search space to the face or portions thereof for the implicit object modeling.

11. A method of video conferencing, the method comprising the steps of:
    detecting a human face of a video conference participant depicted in portions of a video stream;
    creating by explicitly modeling one or more explicit object models to model the face of the video conference participant;
    generating one or more implicit object models relative to parameters obtained from the explicit object models to facilitate creation of a compact encoding of the video conference participant's face;
    using the implicit object model, creating a photorealistic avatar representation of the video conference participant;
    periodically checking to determine whether the implicit object model is working optimally, where the determination that the implicit object modeling is working optimally causes subsequent instances of the photorealistic avatar representation of the conference participant to be created without relying on the step of detecting a human face in the portions of the video stream.

12. A method for providing video conferencing as in claim 1 wherein periodically checking to determine whether the implicit object modeling is working optimally further includes determining that the implicit object models, which are used to create the photorealistic avatar representation, are working optimally by:
    determining that reprojection error is low in the photorealistic avatar representation; and
    determining that there is a significant amount of motion in the photorealistic avatar representation.

13. A method for providing video conferencing as in claim 1 wherein the determination that the implicit object modeling is working optimally causes subsequent instances of the photorealistic avatar representation of the conference participant to be created without relying on the step of detecting a human face in the portions of the video stream.

14. A method for providing video conferencing as in claim 1 wherein determining that the implicit object model is not working optimally by:
    determining that processing of the photorealistic avatar representation uses a disproportional amount of transmission bandwidth; or determining that the implicit object modeling is not working optimally if reprojection error is high.

15. A method for providing video conferencing as in claim 1 further includes responding to the determination that the implicit object modeling is not working by processing the step of detecting a human face of a video conference participant; and
    in response to detecting a human face, searching for existing calibration information for the detected human face.

16. A method for providing video conferencing as in claim 15 wherein if a human face is undetectable, using a Viola-Jones face detector to facilitate detection.

17. A method for providing video conferencing as in claim 1 wherein creating a photorealistic avatar representation of the video conference participant further includes enabling the video conference participant to adjust a gaze of their respective photorealistic avatar representation.

18. A method for providing video conferencing as in claim 1 wherein the gaze adjustment enables configuration of the gaze of the photorealistic avatar representation causes eyes of the photorealistic avatar representation to focus directly in the direction of a video camera.

19. A method of video conferencing, the method comprising the steps of:
    generating explicit object models to model a human face of a video conference participant depicted in portions of a video stream;
    using parameters from the explicit object models, generating one or more implicit object models to create a photorealistic avatar representation of the video conference participant, where the explicit object model parameters are used to define expectations for the implicit object model regarding how lighting interacts with a structure of the face of the video conference participant;
    periodically checking to determine whether the implicit object model is working optimally; and
    responding to a determination that the implicit object model is not working by detecting a face of a video conference participant and responding to the detection by searching for existing calibration information for the detected face.

20. A method for providing video conferencing as in claim 11 further includes periodically checking to determine whether the implicit object modeling is working optimally.

21. A video conferencing system comprising:
    a face detector configured to detect a face of a video conference participant in a video stream;
    a calibrator configured to generate a calibration model calibrating the face of the video conference participant;
    an explicit object modeler configured to generate one or more explicit object models, in combination with the calibrator and face detector, the explicit object models modeling portions of the video stream depicting the face of the video conference participant based on the calibration model;
    an implicit object modeler configured to build one or more implicit object models relative to parameters from the explicit object models to facilitate creation of a compact encoding of the participant's face;
    the system operable to generate a photorealistic avatar representation of the video conference participant from the implicit object model; and
    the system operable to periodically check to determine whether the implicit object model is working optimally, where the determination that the implicit object modeling is working optimally causes subsequent instances of the photorealistic avatar representation of the conference participant to be created without relying on the step of detecting a human face in the portions of the video stream.

22. A method of video conferencing, the method comprising the steps of:
   detecting a human face of a video conference participant depicted in portions of a video stream;
   creating by explicitly modeling one or more explicit object models to model the face of the video conference participant;
   generating one or more implicit object models relative to parameters obtained from the explicit object models to facilitate creation of a compact encoding of the video conference participant's face;
   using the implicit object model, creating a photorealistic avatar representation of the video conference participant; and
   periodically checking to determine whether the implicit object modeling is working optimally including determining that the implicit object models, which are used to create the photorealistic avatar representation, are working optimally by:
   determining that reprojection error is low in the photorealistic avatar representation; and
   determining that there is a significant amount of motion in the photorealistic avatar representation.

23. A video conferencing system comprising:
   a face detector configured to detect a face of a video conference participant in a video stream;
   a calibrator configured to generate a calibration model calibrating the face of the video conference participant;
   an explicit object modeler configured to generate one or more explicit object models, in combination with the calibrator and face detector, the explicit object models modeling portions of the video stream depicting the face of the video conference participant based on the calibration model;
   an implicit object modeler configured to build one or more implicit object models relative to parameters from the explicit object models to facilitate creation of a compact encoding of the participant's face;
   the system operable to generate a photorealistic avatar representation of the video conference participant from the implicit object model; and
   the system operable to periodically check to determine whether the implicit object modeling is working optimally such that the system is operable to determine that the implicit object models, which are used to create the photorealistic avatar representation, are working optimally by:
   determining that reprojection error is low in the photorealistic avatar representation; and
   determining that there is a significant amount of motion in the photorealistic avatar representation.

24. A method of video conferencing, the method comprising the steps of:
   detecting a human face of a video conference participant depicted in portions of a video stream;
   creating by explicitly modeling one or more explicit object models to model the face of the video conference participant;
   generating one or more implicit object models relative to parameters obtained from the explicit object models to facilitate creation of a compact encoding of the video conference participant's face;
   using the implicit object model, creating a photorealistic avatar representation of the video conference participant; and
   periodically checking to determine whether the implicit object modeling is working optimally including determining that the implicit object model is not working optimally by:
   determining that processing of the photorealistic avatar representation uses a disproportional amount of transmission bandwidth; or
   determining that the implicit object modeling is not working optimally if reprojection error is high.

25. A video conferencing system comprising:
   a face detector configured to detect a face of a video conference participant in a video stream;
   a calibrator configured to generate a calibration model calibrating the face of the video conference participant;
   an explicit object modeler configured to generate one or more explicit object models, in combination with the calibrator and face detector, the explicit object models modeling portions of the video stream depicting the face of the video conference participant based on the calibration model;
   an implicit object modeler configured to build one or more implicit object models relative to parameters from the explicit object models to facilitate creation of a compact encoding of the participant's face;
   the system operable to generate a photorealistic avatar representation of the video conference participant from the implicit object model; and
   the system operable to periodically check to determine whether the implicit object modeling is working optimally including determining that the implicit object model is not working optimally by:
   determining that processing of the photorealistic avatar representation uses a disproportional amount of transmission bandwidth; or determining that the implicit object modeling is not working optimally if reprojection error is high.

26. A method of video conferencing, the method comprising the steps of:
   detecting a human face of a video conference participant depicted in portions of a video stream;
   creating by explicitly modeling one or more explicit object models to model the face of the video conference participant;
   generating one or more implicit object models relative to parameters obtained from the explicit object models to facilitate creation of a compact encoding of the video conference participant's face; and
   using the implicit object model, creating a photorealistic avatar representation of the video conference participant;
   wherein creating a photorealistic avatar representation of the video conference participant includes enabling the video conference participant to adjust a gaze of their respective photorealistic avatar representation.

27. A video conferencing system comprising:
   a face detector configured to detect a face of a video conference participant in a video stream;
   a calibrator configured to generate a calibration model calibrating the face of the video conference participant;
   an explicit object modeler configured to generate one or more explicit object models, in combination with the calibrator and face detector, the explicit object models modeling portions of the video stream depicting the face of the video conference participant based on the calibration model;

an implicit object modeler configured to build one or more implicit object models relative to parameters from the explicit object models to facilitate creation of a compact encoding of the participant's face; and the system operable to generate a photorealistic avatar representation of the video conference participant from the implicit object model;

wherein creating a photorealistic avatar representation of the video conference participant includes enabling the video conference participant to adjust a gaze of their respective photorealistic avatar representation.

28. A method of video conferencing, the method comprising the steps of:

detecting a human face of a video conference participant depicted in portions of a video stream;

creating by explicitly modeling one or more explicit object models to model the face of the video conference participant;

generating one or more implicit object models relative to parameters obtained from the explicit object models to facilitate creation of a compact encoding of the video conference participant's face; and using the implicit object model, creating a photorealistic avatar representation of the video conference participant;

wherein the implicit object models are configured using parameters obtained from the explicit object models, such that the explicit object model parameters are used as a ground truth for estimating portions of the video stream with the implicit object models;

wherein the explicit object model parameters are used to define expectations about how lighting interacts with the structure of the face of the video conference participant.

29. A video conferencing system comprising:

a face detector configured to detect a face of a video conference participant in a video stream;

a calibrator configured to generate a calibration model calibrating the face of the video conference participant;

an explicit object modeler configured to generate one or more explicit object models, in combination with the calibrator and face detector, the explicit object models modeling portions of the video stream depicting the face of the video conference participant based on the calibration model;

an implicit object modeler configured to build one or more implicit object models relative to parameters from the explicit object models to facilitate creation of a compact encoding of the participant's face; and the system operable to generate a photorealistic avatar representation of the video conference participant from the implicit object model;

wherein the implicit object model is configured using parameters obtained from the explicit object models, such that the explicit object model parameters are used as a ground truth for estimating portions of the video stream with the implicit object model;

wherein the explicit object model parameters are used to define expectations about how lighting interacts with the structure of the face of the video conference participant.

30. A method of video conferencing, the method comprising the steps of:

detecting a human face of a video conference participant depicted in portions of a video stream;

creating by explicitly modeling one or more explicit object models to model the face of the video conference participant;

generating one or more implicit object models relative to parameters obtained from the explicit object models to facilitate creation of a compact encoding of the video conference participant's face; and using the implicit object model, creating a photorealistic avatar representation of the video conference participant;

wherein the step of detecting a face includes using a Viola/Jones face detector which is operable to:

identify corresponding elements of at least one object associated with the face in two or more video frames from the video stream; and track and classify the corresponding elements to identify relationships between the corresponding elements based on previously calibrated and modeled faces.

31. A video conferencing system comprising:

a face detector configured to detect a face of a video conference participant in a video stream;

a calibrator configured to generate a calibration model calibrating the face of the video conference participant;

an explicit object modeler configured to generate one or more explicit object models, in combination with the calibrator and face detector, the explicit object models modeling portions of the video stream depicting the face of the video conference participant based on the calibration model;

an implicit object modeler configured to build one or more implicit object models relative to parameters from the explicit object models to facilitate creation of a compact encoding of the participant's face; and the system operable to generate a photorealistic avatar representation of the video conference participant from the implicit object model;

wherein the implicit object model provides an implicit representation of the face of the video conference participant;

wherein the face detector is configured to use a Viola/Jones face detector which is operable to:

identify corresponding elements of at least one object associated with the face in two or more video frames from the video stream; and track and classify the corresponding elements to identify relationships between the corresponding elements based on previously calibrated and modeled faces.

* * * * *